US012401426B2

United States Patent
Halder et al.

(10) Patent No.: US 12,401,426 B2
(45) Date of Patent: Aug. 26, 2025

(54) APPARATUS AND METHOD FOR ADJUSTING THE PHASE-MODULATOR'S MODULATING SIGNAL TIME REFERENCE IN A QUANTUM-KEY-DISTRIBUTION SYSTEM

(71) Applicant: CENTRE FOR DEVELOPMENT OF TELEMATICS, Kamataka (IN)

(72) Inventors: Prasanta Halder, New Delhi (IN); Vivek Kumar, New Delhi (IN); Roshan Lal Sharma, New Delhi (IN); Atul Kumar Gupta, New Delhi (IN); Prashant Kumar Rathore, New Delhi (IN)

(73) Assignee: CENTRE FOR DEVELOPMENT OF TELEMATICS, Karnataka (IN)

( * ) Notice: Subject to any disclaimer, the term of this patent is extended or adjusted under 35 U.S.C. 154(b) by 216 days.

(21) Appl. No.: 18/546,440

(22) PCT Filed: Feb. 16, 2022

(86) PCT No.: PCT/IB2022/051364
§ 371 (c)(1),
(2) Date: Aug. 15, 2023

(87) PCT Pub. No.: WO2022/175826
PCT Pub. Date: Aug. 25, 2022

(65) Prior Publication Data
US 2024/0039635 A1     Feb. 1, 2024

(30) Foreign Application Priority Data
Feb. 16, 2021   (IN) .............................. 202141006499

(51) Int. Cl.
*H04B 10/00*      (2013.01)
*H04B 10/548*     (2013.01)
(Continued)

(52) U.S. Cl.
CPC ........... *H04B 10/548* (2013.01); *H04B 10/70* (2013.01)

(58) Field of Classification Search
CPC ..................................................... H04B 10/70
See application file for complete search history.

(56) References Cited

U.S. PATENT DOCUMENTS

| 2020/0304300 A1 | 9/2020 | Rhee | |
| 2021/0021352 A1* | 1/2021 | Yoshino | H04B 10/556 |
| 2022/0021458 A1* | 1/2022 | Woodward | H04B 10/613 |

FOREIGN PATENT DOCUMENTS

WO    2020078169 A1    4/2020

* cited by examiner

*Primary Examiner* — Daniel G Dobson
(74) *Attorney, Agent, or Firm* — Blueshift IP; Robert Plotkin

(57) ABSTRACT

The present disclosure relates to the field Quantum Key distribution (QKD) and discloses an apparatus (100) and method (300) for adjusting the phase modulator's modulating signal time reference in a phase-based QKD system. The QKD system comprises a pulse generator (10) that generates optical pulses and a phase modulator (20) that modulates the phase of each of the pulses. The apparatus (100) comprises abeam splitter/tap (112), a 1-bit delay interferometer (110), two photodetectors (106,108), and a processing device (104). The splitter feeds the phase modulated optical pulses to the interferometer (110). Two photo detectors are connected to the constructive and destructive output legs (110a, 110b) of the interferometer (110). The photo detectors' output are then converted to digital signals and fed to the processing device (104). The processing device (104) measures the average power at both the legs of the interferometer (110) to detect delay between optical signal and modulating signal and adjusts the delay to accurately align the phase modulator (20) with the pulse generator (10).

10 Claims, 7 Drawing Sheets

(51) Int. Cl.
*H04B 10/70* (2013.01)
*H04J 14/00* (2006.01)

APPARATUS AND METHOD FOR ADJUSTING THE PHASE-MODULATOR'S MODULATING SIGNAL TIME REFERENCE IN A QUANTUM-KEY-DISTRIBUTION SYSTEM

FIELD

The present disclosure generally relates to the field of Quantum Key Distribution (QKD). More particularly, the present disclosure relates to an apparatus and method for adjusting the phase modulator's modulating signal time reference in a QKD system.

Definitions

As used in the present disclosure, the following terms are generally intended to have the meaning as set forth below, except to the extent that the context in which they are used indicate otherwise.

Quantum Key Distribution—The term 'Quantum Key Distribution' used hereinafter in the disclosure refers to a secure communication technique that implements a cryptographic protocol which is based on the principles of quantum mechanics to enable two parties (Alice and Bob) to produce a shared random secret key known only to them, which can then be used to encrypt and decrypt messages.

Phase-based Quantum Key Distribution—The term 'Phase-based Quantum Key Distribution' used hereinafter in the disclosure refers to a Quantum Key Distribution system that uses a phase-encoding protocol, in which a random bit stream is transmitted in the form of variations in the instantaneous phase of an optical signal, for generation of the shared random secret key.

Modulating signal—The term 'modulating signal' used hereinafter in the disclosure refers to a signal which contains information to be transmitted. The signal may encode a binary information (low and high states), represented by numerals 0 and 1, in the form of voltage pulses having certain characteristic (for e.g. RZ (return-to-zero) signal).

Phase modulator—The term 'phase modulator' used hereinafter in the disclosure refers to a device which is used for manipulating an optical signal or optical pulses by changing the phase of the signal in accordance with the modulating signal.

Time reference—The term 'time reference' used hereinafter in the disclosure refers to a parameter that serves as a reference for generating the modulating signal of intensity modulator and phase modulator. This time reference can be considered as the phase difference/time delay between the modulating signals of intensity modulator and phase modulator.

Phase modulator (PM) Alignment state—The term "Phase modulator (PM) Alignment state" used hereinafter in the disclosure refers to an operating state of the Quantum Key Distribution (QKD) system in which the sending end node (Alice node) performs alignment of the phase modulator with the optical pulse generator/intensity modulator. The phase modulator alignment is executed after all the devices of the QKD system are initialized and before tuning of the receiving end node's (Bob's) interferometer is performed. Typically, the state of the system is monitored by the sending end node (Alice node).

BACKGROUND

The background information herein below relates to the present disclosure but is not necessarily prior art.

Typically, in a phase-based Quantum Key Distribution (QKD) system (for e.g. differential phase shift QKD system, phased based BB84, etc.), a narrow pulse generated by a pulse generator is modulated to '0' or 'pi' phase on the basis of a random bit stream using a phase modulator (PM). For effective modulation of the optical pulses, it is essential to have a proper alignment between the pulses generated by the pulse generator and the modulating signal of the phase modulator. Any inaccuracy in phase modulator alignment can lead to modulation of pulses with transitioning/unstable phases, which can further result in high Quantum Bit Error Rate (QBER). This can lead to the failure in generation of identical keys at both the nodes (i.e. Alice node and Bob node) of the QKD system.

To overcome phase modulator alignment issues, some of the conventional QKD systems generate the optical signal and the phase modulator's modulating signal from the same device using the same time reference. However, this does not solve the alignment problem as there are unknown delays/latencies in all the modulators as well as system-dependent electrical and optical path delays, which cannot be avoided and can therefore lead to improper alignment.

Therefore, there is a need for an apparatus and method for adjusting the time reference of phase modulator's modulating signal to achieve alignment between the phase modulator and the pulse generator automatically during system start, thereby overcoming the aforementioned drawbacks.

OBJECTS

Some of the objects of the present disclosure, which at least one embodiment herein satisfies, are as follows.

It is an object of the present disclosure to ameliorate one or more problems of the prior art or to at least provide a useful alternative.

An object of the present disclosure is to provide an apparatus and method for adjusting the phase modulator's modulating signal time reference in a Quantum Key Distribution (QKD) system.

Another object of the present disclosure is to provide an apparatus and method that accurately aligns the modulating signal of the phase modulator with an optical signal of a pulse generator in a Quantum Key Distribution (QKD) system.

Still another object of the present disclosure is to provide an apparatus and method for adjusting the phase modulator's modulating signal time reference in a Quantum Key Distribution (QKD) system that reduces the Quantum Bit Error Rate (QBER).

Yet another object of the present disclosure is to provide an apparatus and method for adjusting the phase modulator's modulating signal time reference in a Quantum Key Distribution (QKD) system that eliminates the requirement of characterization of the phase modulator or the pulse generator.

Still another object of the present disclosure is to provide an apparatus for adjusting the phase modulator's modulating signal time reference in a Quantum Key Distribution (QKD) system that eliminates the requirement of having a fixed Radio Frequency (RF) cable length of the modulating signal.

Yet another object of the present disclosure is to provide an apparatus for adjusting the phase modulator's modulating signal time reference in a Quantum Key Distribution (QKD)

system that automatically re-aligns the modulating signal if the cable length/phase delay changes.

Other objects and advantages of the present disclosure will be more apparent from the following description, which is not intended to limit the scope of the present disclosure.

SUMMARY

The present disclosure envisages an apparatus and method for adjusting the phase modulator's modulating signal time reference in a Quantum Key Distribution (QKD) system. The QKD system comprises a sending end node and a receiving end node. The sending end node includes a pulse generator and a phase modulator. The pulse generator generates a stream of optical pulses with a pre-defined time interval (T) between the adjacent pulses. The phase modulator receives the optical pulses and, during normal key exchange operation, the phase modulator uses a non-return-to-zero (NRZ) modulating signal to modulate the phase of each of the pulses and generate a first stream of modulated pulses. The NRZ modulating signal is generated based on a random bit stream. The phase modulator then sends the first stream of phase modulated pulses to the receiving end node through a quantum channel.

The apparatus comprises a processing device, a beam splitter, a two-arm interferometer, a first photodetector, and a second photodetector. The processing device is configured to detect a phase modulator (PM) alignment state and generate a return-to-zero (RZ) modulating signal during the PM alignment state. The RZ modulating signal is encoded with consecutive one and zero bits and generated using a time reference. The processing device is further configured to send the generated RZ modulating signal to the phase modulator to facilitate modulation of each of the optical pulses by the phase modulator in accordance with the RZ modulating signal leading to the generation of a second stream of modulated pulses. The beam splitter is located in the quantum channel and is connected to the phase modulator. The beam splitter is configured to receive the second stream of phase modulated pulses from the phase modulator and split the received second stream of phase modulated pulses into two consequent phase modulated pulses for propagation along a first path of the quantum channel to the receiving end node and along a second path for phase adjustment. The two-arm interferometer has two output legs and it is located in the second path from the beam splitter. The interferometer is configured to receive the modulated pulses through the second path and provide demodulated pulses having the pre-defined time interval (T) between adjacent pulses at the output legs. The first photodetector is connected to a first output leg of the interferometer, and is configured to receive the demodulated pulses after constructive interference from the interferometer and generate a corresponding digital output. Similarly, the second photodetector is connected to a second output leg of the interferometer, and is configured to receive the demodulated pulses after destructive interference from the interferometer and generate a corresponding digital output. The processing device is configured to receive the digital outputs from the photodetectors and measure an average power in each leg of the interferometer based on the received digital outputs. The processing device is further configured to implement a logic to detect a delay between the optical pulses generated by the pulse generator and the modulating signal based on the measured average power and adjust the time reference to compensate the detected delay for aligning the pulse generator with the phase modulator.

In an embodiment, the processing device comprises a signal generator, a power measuring unit, a delay detection unit, and a delay adjusting unit. The signal generator is configured to detect the PM alignment state and generate the alternate one and zero Return-to-zero (RZ) encoded signal of half bit interval pulse-width (i.e. T/2), using the time reference, as the RZ modulating signal of the phase modulator during the PM alignment state. The power measuring unit is configured to measure the average power in each leg of the interferometer using the digital outputs from the first and second photodetectors. The delay detection unit is configured to cooperate with the power measuring unit to compare the average power measured in first leg of the interferometer with the average power measured in second leg to detect the delay between the optical pulses generated by the pulse generator and the RZ modulating signal. The delay adjusting unit is configured to cooperate with the delay detection unit to compensate the detected delay by shifting the phase modulator's modulating signal time reference until the average power measured in one leg of the interferometer is greater than the average power measured in the other leg.

In an embodiment, the delay detection unit comprises a comparator and a detecting module. The comparator is configured to compare the average power measured in first leg of the interferometer with the average power measured in second leg to generate a comparison output. The detecting module is configured to cooperate with the comparator to detect the presence of the delay between the optical pulses and the modulating signal when the comparison output is below a pre-defined range. This condition occurs when a non-zero average power is measured at both the first output leg and the second output leg.

Advantageously, the processing device is implemented using one or more Programmable logic devices selected from the group consisting of a mask programmable gate array (MPGA), an Application Specific Integrated Circuit (ASIC), a simple programmable logic device (SPLD), a complex programmable logic device (CPLD), and a Field Programmable Gate Array (FPGA).

In an embodiment, the processing device is an integral part of the phase modulator.

In an embodiment, the interferometer comprises an optical input path, at least two interferometer arms, and two output legs. The optical input path receives the second stream of modulated pulses from the beam splitter. The interferometer arms are connected to the optical input path, wherein one of the arms includes a delay element for providing the pre-defined time interval (T) between the received successive modulated pulses. The two output legs are connected to the interferometer arms. The output legs are configured to receive the demodulated pulses from the arms and feed the demodulate pulses to the first and second photodetectors.

In an embodiment, the photodetectors are connected to the output legs of the interferometer in a way that, if adjacent pulses are in phase, the demodulated pulse will appear at the first photodetector and if adjacent pulses are out of phase, the demodulated pulse will appear at the second photodetector.

In another embodiment, the photodetectors are connected to the output legs of the interferometer in a way that if adjacent pulses are in phase, the demodulated pulse will appear at the second photodetector and if adjacent pulses are out of phase, the demodulated pulse will appear at the first photodetector.

The present disclosure further envisages a method for adjusting the phase modulator's modulating signal time reference in a phase-based Quantum Key Distribution (QKD) system.

BRIEF DESCRIPTION OF THE ACCOMPANYING DRAWING

An apparatus and method for adjusting the phase modulator's modulating signal time reference in a Quantum Key Distribution (QKD) system of the present disclosure will now be described with the help of the accompanying drawing, in which.

LIST OF REFERENCE NUMERALS USED IN DETAILED DESCRIPTION AND DRAWINGS

Figure 1:
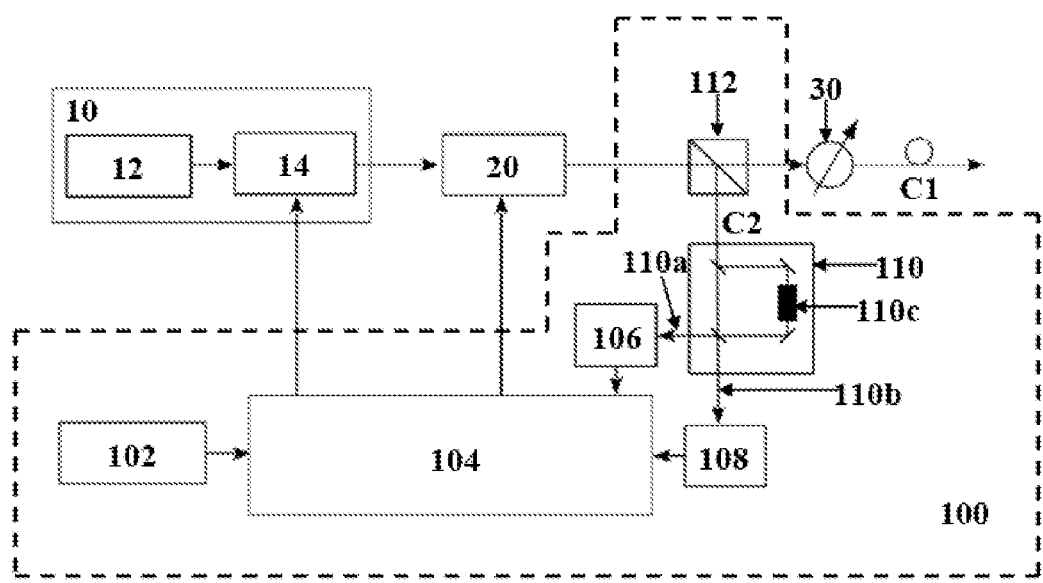
FIG. 1 illustrates a block diagram of an apparatus for adjusting the phase modulator's modulating signal time reference in a Quantum Key Distribution (QKD) system, in accordance with the present disclosure.
Figure 2:
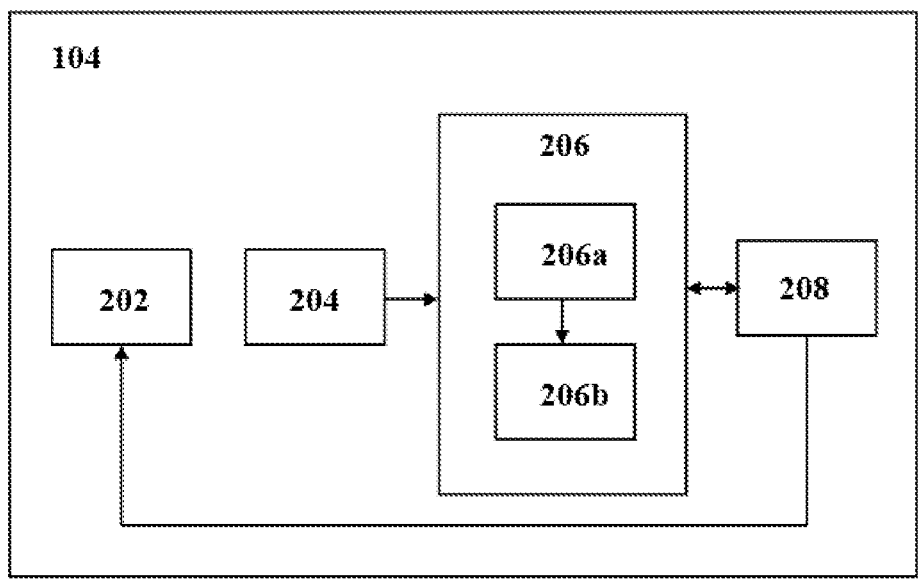
FIG. 2 illustrates a block diagram of a processing device of the apparatus of FIG. 1, in accordance with the present disclosure.

100—Apparatus
10—Pulse generator
12—Continuous wave (CW) source
14—Intensity modulator
20—Phase modulator
30—Variable optical attenuator (VOA)
C1—First path of quantum channel
C2—Second path of quantum channel
P—Optical pulse
M, M1, M2—Modulating signal
102—Clock unit
104—Processing device
106—first photodetector
108—Second photodetector
110—Two-arm interferometer
110a—First output leg
110b—Second output leg
110c—Delay element
112—Beam splitter
202—Signal generator
204—Power measuring unit
206—Delay detection unit
206a—Comparator
206b—Detecting module
208—Delay adjusting unit

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details, are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

When an element is referred to as being "connected to," another element, it may be directly connected to the other element. As used herein, the term "and/or" includes any and all combinations of one or more of the associated listed elements.

The terms first, second, third, etc., should not be construed to limit the scope of the present disclosure as the aforementioned terms may be only used to distinguish one element, component, region, or section from another element, component, region, or section. Terms such as first, second, third etc., when used herein do not imply a specific sequence or order unless clearly suggested by the present disclosure.

Typically, a phase-based quantum key distribution system (for e.g. differential phase shift Quantum Key Distribution (QKD) system, phased based BB84, etc.) comprises a pulse generator/intensity modulator and a phase modulator. The pulse generator generates narrow pulses of light. These pulses are modulated to '0' or 'pi' phases by a phase modulator (PM) based on a random bit stream. For effective modulation, there should be a proper alignment between the pulses generated by the pulse generator and the modulating signal of the phase modulator. Any inaccuracy in phase modulator alignment can lead to the modulation of pulses with transitioning/unstable phases, which can further result in high Quantum Bit Error Rate (QBER). This can lead to the failure of the QKD system in generating identical keys at both the nodes (i.e. Alice node and Bob node).

Further, generation of the optical signal (pulses) and the phase modulator's modulating signal from the same device using the same time reference also does not solve the alignment problem as there are unknown delays/latencies in all the modulators as well as system-dependent electrical and optical path delays, which cannot be avoided and can therefore lead to improper alignment.

In order to overcome the limitations of existing techniques, an apparatus (hereinafter referred to as 'apparatus 100') for adjusting the phase modulator's modulating signal time reference in a phase-based Quantum Key Distribution (QKD) system and a method thereof (hereinafter referred to as 'method 300') are now being described with reference to FIG. 1 through FIG. 5E.

The QKD system comprises a sending end node (also referred to as Alice/Alice node) and a receiving end node (also referred to as Bob/Bob node). Referring to FIG. 1, the sending end node comprises a pulse generator 10 and a phase modulator 20. The pulse generator 10 generates a stream of optical pulses with a pre-defined time interval (T) between the adjacent pulses. In an embodiment, the pulse generator 10 includes a continuous wave (CW) source 12 and an intensity modulator 14. The CW source 12 may generate a continuous laser beam. The intensity modulator 14 may modulate the intensity of the laser beam to generate a pulsed beam or optical pulses. The phase modulator 20 receives the optical pulses. During normal key exchange operation, the phase modulator 20 uses a non-return-to-zero (NRZ) modulating signal to modulate the phase of each of the pulses and thereby generate a first stream of modulated pulses. The NRZ modulating signal is generated based on a random bit stream. The phase modulator 20 then sends the first stream of phase modulated pulses to the receiving end node (Bob) through a quantum channel.

The apparatus 100 comprises a processing device 104, a beam splitter 112, a two-arm interferometer 110, a first photodetector 106, and a second photodetector 108. The processing device 104 is configured to detect a phase modulator (PM) alignment state and generate a return-to-zero (RZ) modulating signal during the PM alignment state. The processing device 104 is further configured to send the generated RZ modulating signal to the phase modulator 20 to facilitate modulation of each of the optical pulses by the phase modulator in accordance with the RZ modulating signal leading to the generation of a second stream of modulated pulses. The RZ modulating signal is encoded with consecutive one and zero bits and generated using a time reference. The time reference is a parameter that serves as a reference for generating the RZ modulating signal of the phase modulator. The initial value of this parameter may be zero. The beam splitter 112 is located in the quantum channel and is connected to the phase modulator 20. The beam splitter 112 is configured to receive the second stream of phase modulated pulses from the phase modulator 20 and split the received second stream of phase modulated pulses into two consequent phase modulated pulses for propagation along a first path C1 of the quantum channel to the receiving end node (Bob) and along a second path C2 for phase adjustment. The modulated pulses in the first path C1 may be passed through a Variable Optical Attenuator (VOA) 30 to attenuate or otherwise extinguish the phase modulated pulses whenever required, for example, during startup phase of the apparatus 100 until a stabilized operating state is reached.

The two-arm interferometer 110 has two output legs (110a, 110b) and it is located in the second path C2 from the beam splitter 112. The interferometer 110 is configured to receive the second stream of modulated pulses through the second path C2 and provide demodulated pulses having the pre-defined time interval (T) between adjacent pulses at the output legs (110a, 110b). The first photodetector 106 is connected to a first output leg 110a of the interferometer 110, and is configured to receive the demodulated pulses after constructive interference from the interferometer 110 and generate a corresponding digital output. Similarly, the second photodetector 108 is connected to a second output leg 110b of the interferometer 110, and configured to receive the demodulated pulses after destructive interference from the interferometer 110 and generate a corresponding digital output. The processing device 104 is configured to receive the digital outputs from the photodetectors (106, 108) and measure an average power in each leg of the interferometer 110 based on the received digital outputs. The processing device 104 is further configured to implement a logic to detect a delay between the optical pulses generated by the pulse generator 10 and the RZ modulating signal based on the measured average power and adjust the time reference (parameter) to compensate the detected delay for aligning the pulse generator 10 with the phase modulator 20.

In an embodiment, the processing device 104 comprises a signal generator 202, a power measuring unit 204, a delay detection unit 206, and a delay adjusting unit 208. The signal generator 202 is configured to detect the PM alignment state and generate the alternate one and zero Return-to-zero (RZ) encoded signal of half bit interval pulse-width (i.e. T/2), using the time reference (parameter), as the modulating signal of the phase modulator 20. In an embodiment, the clock unit 102 generates a clock signal for operating or driving the processing device 104. The clock unit 102 may be configured as an integral part of the processing device 104. Alternatively, the clock unit 102 may be a separate unit coordinating with the processing device 104. The power measuring unit 204 is configured to measure the average power in each leg of the interferometer 110 using the digital outputs from the first and second photodetectors (106, 108). The delay detection unit 206 is configured to cooperate with the power measuring unit 204 to compare the average power measured in first leg of the interferometer 110 with the average power measured in second leg to detect the delay between the optical pulses generated by the pulse generator 10 and the RZ modulating signal. The delay adjusting unit 208 is configured to cooperate with the delay detection unit 206 to compensate the detected delay by shifting the phase modulator's modulating signal time reference until the average power measured in one leg of the interferometer 110 is greater than the average power measured in the other leg.

In an embodiment, the delay detection unit 206 comprises a comparator 206a and a detecting module 206b. The comparator 206a is configured to compare the average power measured in first leg of the interferometer 110 with the average power measured in second leg to generate a comparison output. The detecting module 206b is configured to cooperate with the comparator 206a to detect the presence of the delay between the optical pulses and the RZ modulating signal when the comparison output is below a pre-defined range. This condition occurs when a non-zero average power is measured at both the first output leg 110a and the second output leg 110b.

Advantageously, the processing device 104 is implemented using one or more Programmable logic devices (PLDs) selected from the group consisting of a mask programmable gate array (MPGA), an Application Specific Integrated Circuit (ASIC), a simple programmable logic device (SPLD), a complex programmable logic device (CPLD), and a Field Programmable Gate Array (FPGA).

Alternatively, the processing device 104 may be implemented using general-purpose processors, Digital Signal Processors (DSPs), microprocessors, microcontrollers, or state machines. The processing device 104 may also be implemented as a combination of computing devices, e.g., a combination of a DSP and a microprocessor, a plurality of microprocessors, one or more microprocessors in conjunction with a DSP core, or any other such configuration. The processors may be configured to retrieve data from and/or write data to a memory. The memory may be, for example, a random-access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth.

In an embodiment, the processing device 104 is an integral part of the phase modulator 20.

In an embodiment, the interferometer 110 comprises an optical input path, at least two interferometer arms, and two output legs (110a, 110b). The optical input path receives the first stream of modulated pulses from the beam splitter 112. The interferometer arms are connected to the optical input path, wherein one of the arms includes a delay element 110c for providing the pre-defined time interval (T) between the received successive modulated pulses. The two output legs (110a, 110b) are connected to the interferometer arms. The output legs (110a, 110b) are configured to receive the demodulated pulses from the arms and feed the demodulate pulses to the first and second photodetectors (106, 108).

In an embodiment, the photodetectors (106, 108) are connected to the output legs (110a, 110b) of the interferometer 110 in a way that, if adjacent pulses are in phase, the demodulated pulse will appear at the first photodetector 106 and if adjacent pulses are out of phase, the demodulated pulse will appear at the second photodetector 108.

In another embodiment, the photodetectors (106, 108) are connected to the output legs (110a, 110b) of the interferometer 110 in a way that if adjacent pulses are in phase, the demodulated pulse will appear at the second photodetector 108 and if adjacent pulses are out of phase, the demodulated pulse will appear at the first photodetector 106.

The present disclosure further envisages a method for adjusting the phase modulator's modulating signal time reference in a phase-based Quantum Key Distribution (QKD) system.

The QKD system comprises a sending end node and a receiving end node. The sending end node comprises a pulse generator 10 configured to generate a stream of optical pulses with a pre-defined time interval (T) between the adjacent pulses and a phase modulator 20 configured to receive the optical pulses, use a non-return-to-zero (NRZ) modulating signal generated to modulate the phase of each of the pulses thereby generating a first stream of modulated pulses, and send the first stream of phase modulated pulses to the receiving end node through a quantum channel. The NRZ modulating signal is generated based on a random bit stream.

Figure 3A:
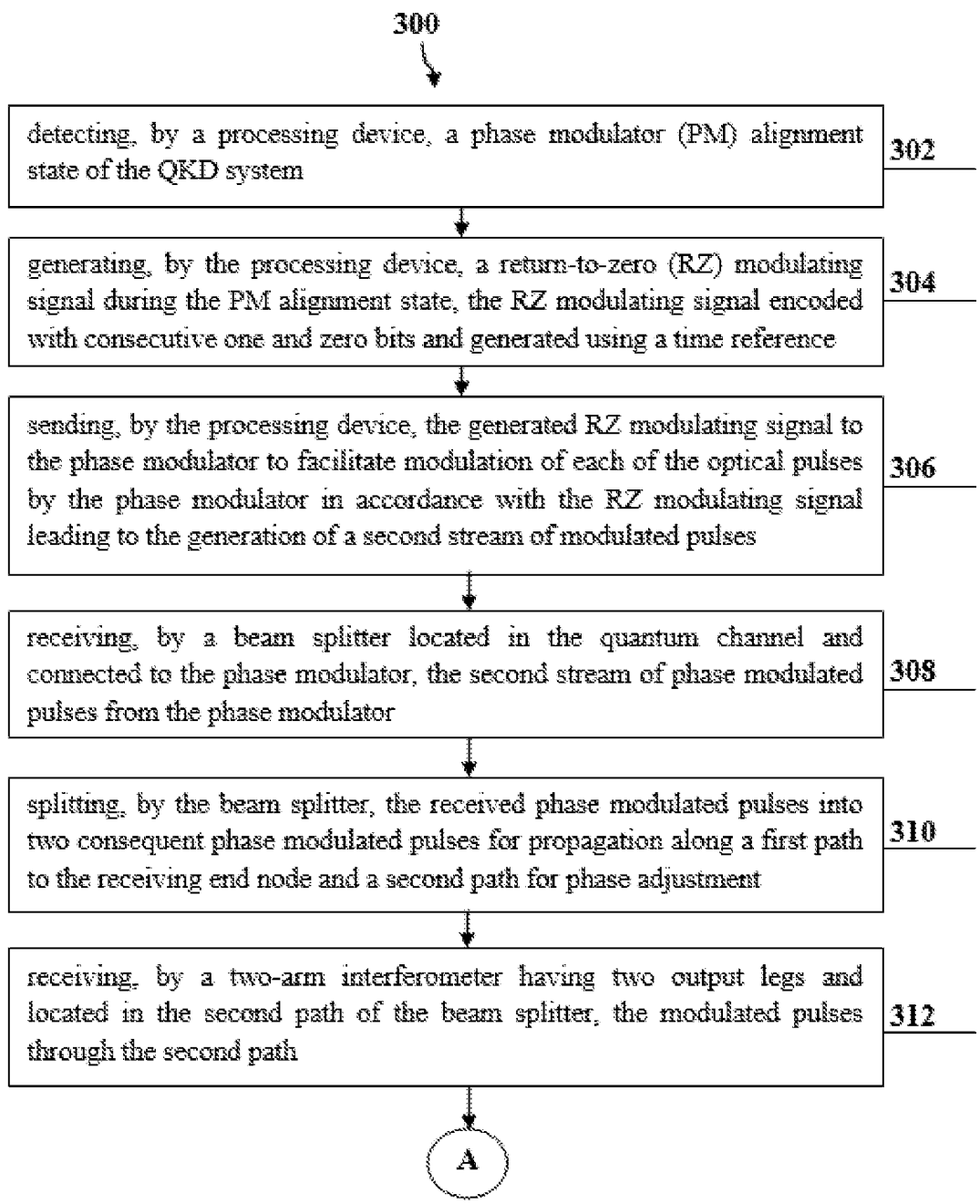
FIGS. 3A and 3B illustrate a flow diagram depicting steps involved in a method for adjusting the phase modulator's modulating signal time reference in a Quantum Key Distribution (QKD) system, in accordance with the present disclosure.
Figure 3B:
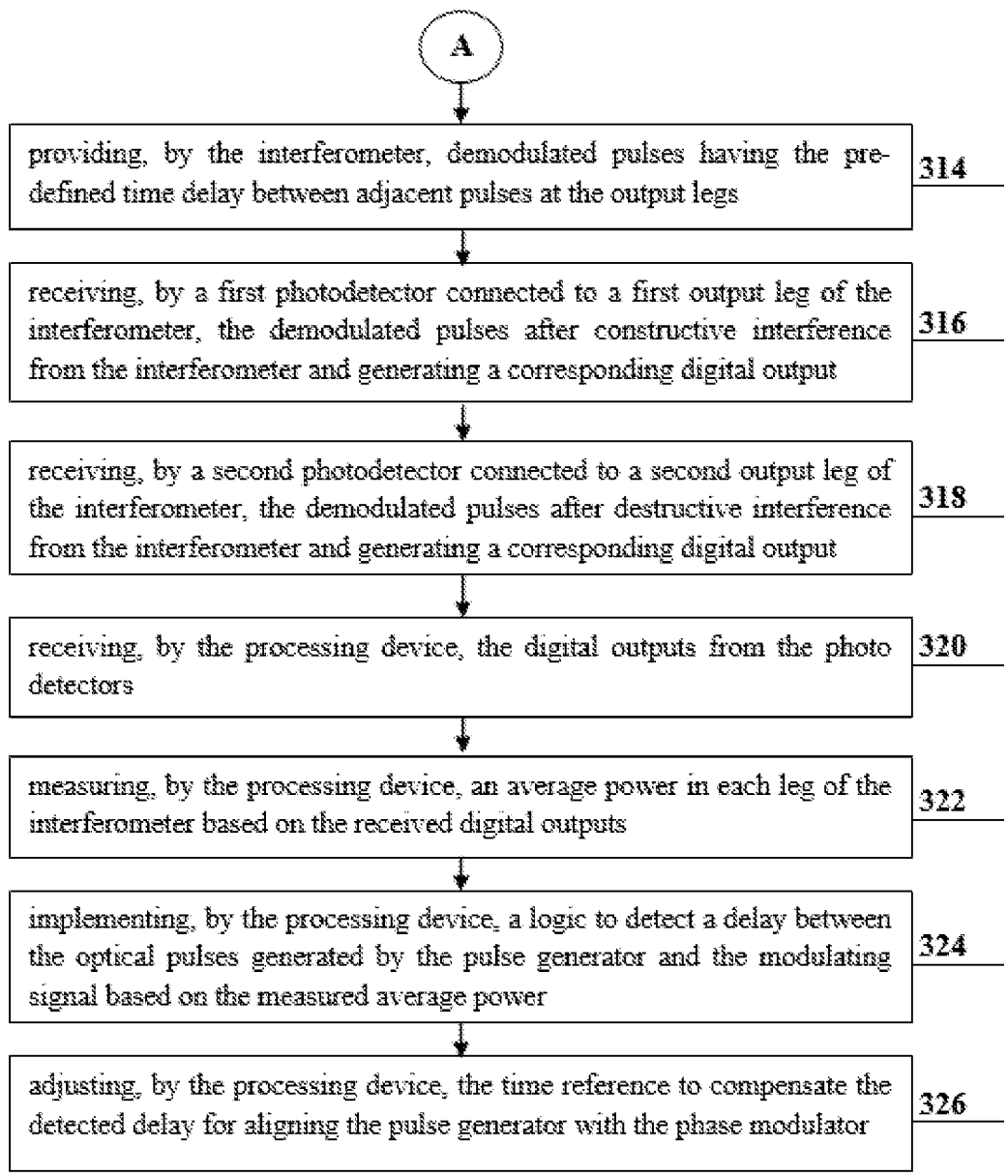
Figure 4:
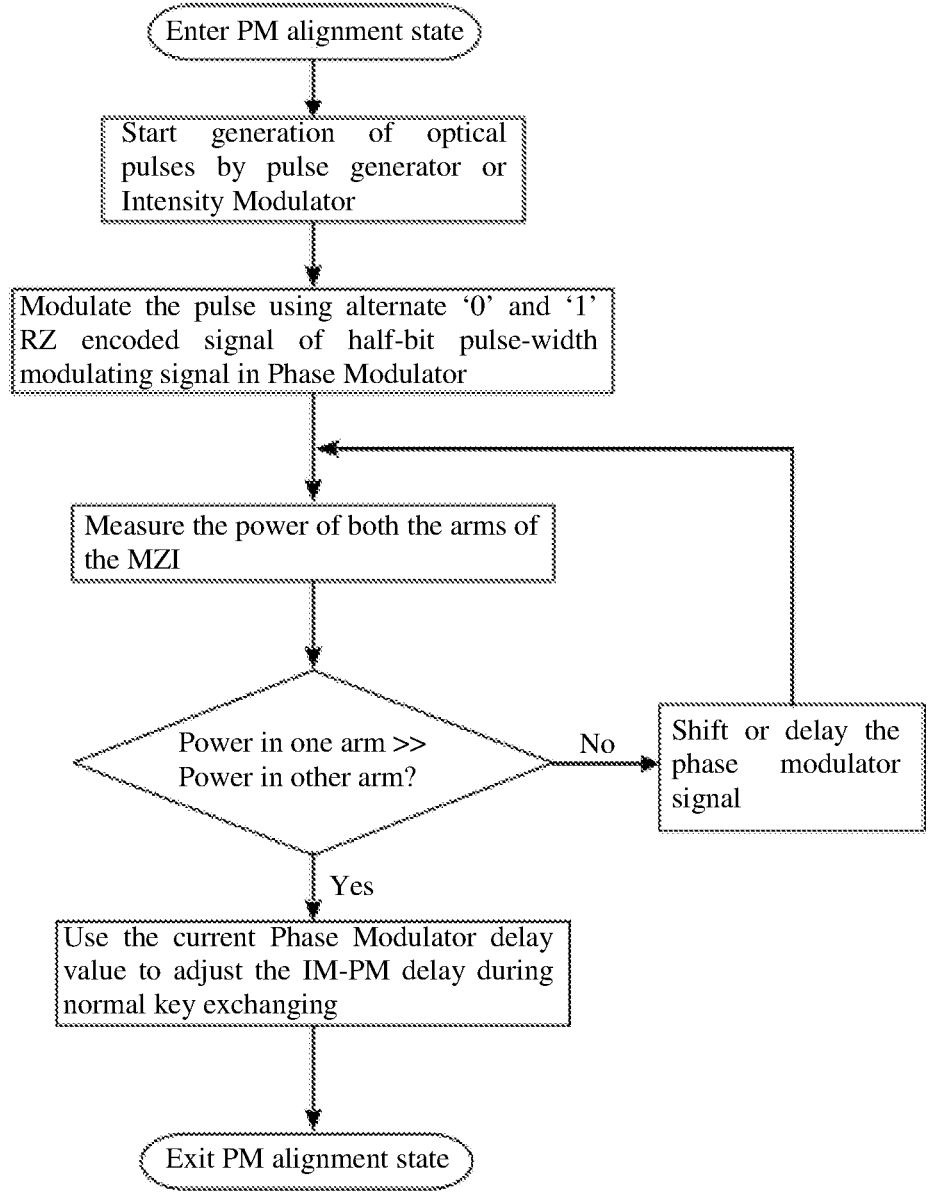
FIG. 4 illustrates an exemplary flow chart depicting implementation logic of the method of FIGS. 3A and 3B, in accordance with the present disclosure.

Referring to FIGS. 3A and 3B, the method 300 comprises the following steps:

At step 302, detecting, by a processing device 104, a phase modulator (PM) alignment state of the QKD system;

At step 304, generating, by the processing device 104, a return-to-zero (RZ) modulating signal during the PM alignment state, the RZ modulating signal being encoded with consecutive one and zero bits and generated using a time reference (parameter);

At step 306, sending, by the processing device 104, the generated RZ modulating signal to the phase modulator 20 to facilitate modulation of each of the optical pulses by the phase modulator in accordance with the RZ modulating signal leading to the generation of a second stream of modulated pulses;

At step 308, receiving, by a beam splitter 112 located in the quantum channel and connected to the phase modulator 20, the second stream of phase modulated pulses from the phase modulator 20;

At step 310, splitting, by the beam splitter 112, the received second stream of phase modulated pulses into two consequent phase modulated pulses for propagation along a first path C1 of the quantum channel to the receiving end node and along a second path C2 for phase adjustment;

At step 312, receiving, by a two-arm interferometer 110 having two output legs (110a, 110b) and located in the second path C2 from the beam splitter 112, the modulated pulses through the second path C2;

At step 314, providing, by the interferometer 110, demodulated pulses having the pre-defined time interval (T) between adjacent pulses at the output legs (110a, 110b);

At step 316, receiving, by a first photodetector 106 connected to a first output leg 110a of the interferometer 110, the demodulated pulses after constructive interference from the interferometer 110 and generating a corresponding digital output;

At step 318, receiving, by a second photodetector 108 connected to a second output leg 110b of the interferometer 110, the demodulated pulses after destructive interference from the interferometer 110 and generating a corresponding digital output;

At step 320, receiving, by the processing device 104, the digital outputs from the photodetectors (106, 108);

At step 322, measuring, by the processing device 104, an average power in each leg of the interferometer 110 based on the received digital outputs;

At step 324, implementing, by the processing device 104, a logic to detect a delay between the optical pulses generated by the pulse generator 10 and the RZ modulating signal based on the measured average power; and At step 326, adjusting, by the processing device 104, the time reference to compensate the detected delay for aligning the pulse generator 10 with the phase modulator 20.

Figure 5A:
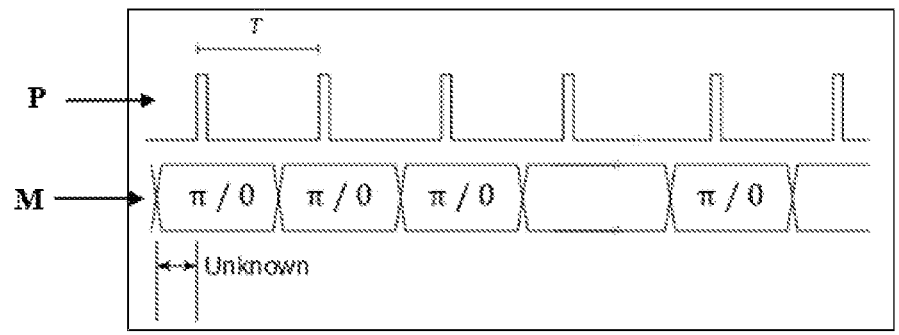
FIGS. 5A, 5b, 5C, 5D and 5E illustrate modulating signal and optical signal waveforms under different operating conditions of the apparatus of FIG. 1, in accordance with the present disclosure.

Thus, the apparatus 100 and method 300 allow detection and measurement of an unknown delay, shown in FIG. 5A, between the optical pulses of the pulse generator 10 and the phase modulator's modulating signal. The apparatus 100 and the method 300 further allow adjustment of this delay so that optical pulses can be properly modulated. This is achieved by implementing the logic described herein below with reference to FIG. 4.

The state in which this adjustment or alignment is implemented is referred to as 'PM alignment state'.

Figure 5B:
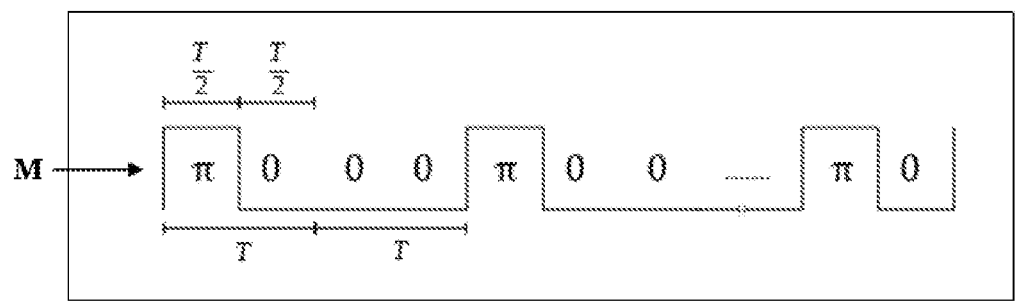

When the Alice node comes in Phase modulation (PM) alignment state, the processing device 104 starts sending the alternate one and zero RZ (return-to-zero) encoded signal of half bit interval pulse-width (i.e. T/2) as the modulating signal (M) of the phase modulator 20 as shown in FIG. 5B.

Figure 5C:
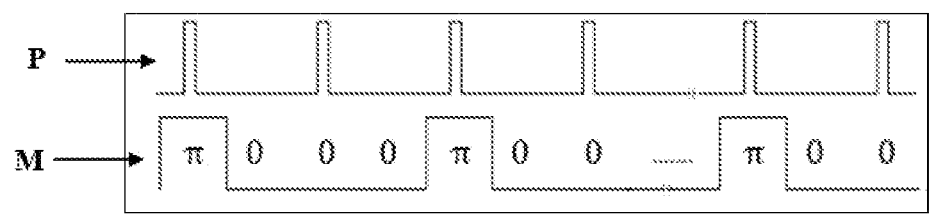

After this, the processing device 104 measures the average power at both the arms of the interferometer 110 using photodetectors (106, 108) and detects one of the following three cases/conditions:

1. The optical pulses (P) fed into the phase modulator 20 overlap perfectly with the high level and low level of modulating signal (M, RZ encoded signal) consecutively as shown in FIG. 5C. In this case, the optical pulses (P) get modulated with 0 and pi degree phase consecutively which results in 180 degree phase difference between successive pulses. As a result, the power detected at the destructive interference leg will be maximum power while power detect at the constructive interference leg of the interferometer 110 will be minimum. This is because destructive interference occurs when the successive optical pulses of the demodulated signal are out of phase whereas constructive interference occurs when the successive optical pulses of the demodulated signal are in phase.

Figure 5D:
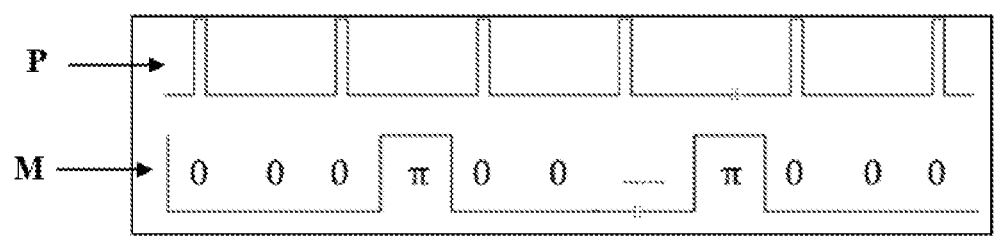

2. The optical pulses (P) fed into the phase modulator 20 overlap perfectly only with the low level of modulating signal (M) as shown in FIG. 5D. In this case, all the optical pulses (P) get modulated with 0 degree phase which results in zero phase difference between the successive pulses. As a result, the power measured at the destructive interference leg will be zero and the power measured at the constructive interference leg will be maximum.

Figure 5E:
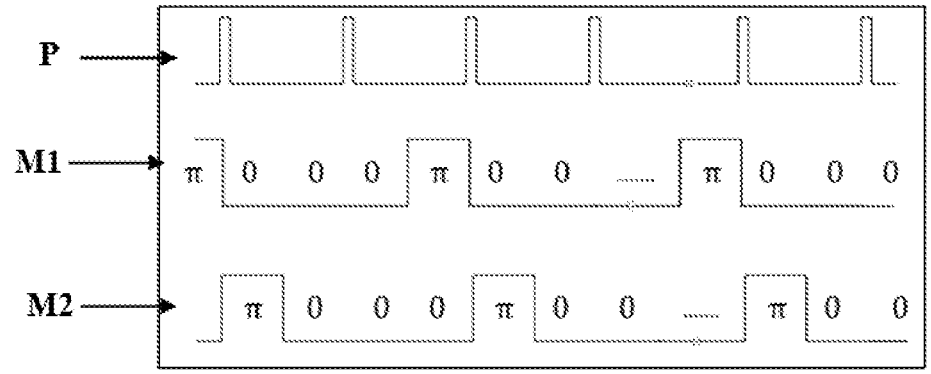

3. The optical pulses (P) fed into the phase modulator 20 overlap with the transitioning/unstable modulating signal (M) as shown in FIG. 5E. In this case, some portion of the optical pulse gets modulated with 0 while the other portion gets modulated with pi degree phase. This will result in non-zero power in both the destructive and constructive legs of the interferometer 110.

By measuring the power in each leg of the interferometer 110 using the photodetectors, the processing device 104 can conclude which of the above situations (1, 2, and 3) has occurred. In other words, if power in one leg of the interferometer 110 is greater than that in the other leg, then either situation 1 or 2 has occurred. If this is not the case (i.e. in case 3), the processing device 104 will shift or delay the phase modulator's modulating signal time reference until either of the conditions 1 or 2 is achieved by measuring the power in interferometer's legs.

Once either condition 1 or condition 2 is achieved, the PM alignment state is completed and the delay measured in this state is used during the normal key exchange operation to modulate the optical pulses based on the random bit stream. The measurement of delay and adjustment of time reference helps in ensuring that all the pulses get correctly modulated with their desired modulating signal during normal key exchange operation.

At the points of transition of the NRZ modulating signal, the phase modulation is not perfect due to rising/falling slope and signal jitter. Therefore, it is preferable to align the optical pulses with the midpoint of the NRZ modulating signal to minimize the error due to signal jitter. To align the modulating signal with the optical pulses, in PM alignment state, a modulating signal with consecutive 0s and 1s is sent to the phase modulator, wherein the 0s and is may correspond to the phases 0 and $\pi$ respectively. In addition to this, the modulating signal is made RZ i.e. the modulating signal is made to drop (return) to zero after the midpoint as shown in FIG. 5B. It can be seen from the FIG. 5E that the falling edge of the RZ modulating signal M1 corresponds to the midpoint of the NRZ signal. In this case, an increase in the delay of the modulating signal M1 will lead to the case 1 as shown in FIG. 5C. Similarly, an increase in the delay of the modulating M2 of case 3 will lead to case 2 as shown in FIG. 5D. In order to find the actual midpoint of the NRZ modulating signal, the subcase of case 3 needs to be determined in which a slight delay in the modulating signal (M1) leads to the case 1 shown in FIG. 5C.

In conventional QKD systems, errors in alignment can occur due to unknown delays/latencies in modulators as well as system-dependent electrical and optical parameters (viz. delay from optical input port to output port and delay from RF input port to optical output port). These parameter values may vary slightly from device to device. For proper performance of QKD system, it is essential to get the exact values of these parameters. This is usually done either manually or automatically using a calibration setup. This calibration process is called as 'phase modulator characterization'. The present invention does away with the requirement for characterization as the variation of delay parameters is automatically adjusted by changing the time reference of the modulating signal.

The apparatus 100 as envisaged in this disclosure was tested and the Quantum Bit Error Rate (QBER) was found to be less than 4%. If the Intensity Modulator-Phase modulator (IM-PM) alignment is not carried out, the QBER can vary in a wide range and in some instances the key generation process can also stop.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

Technical Advancements

The present disclosure described herein above has several technical advantages including, but not limited to, the realization of an apparatus and method for adjusting the phase modulator's modulating signal time reference in a Quantum Key Distribution (QKD) system that:
  accurately aligns the modulating signal of the phase modulator with an optical signal of a pulse generator;
  reduces the Quantum Bit Error Rate (QBER);
  eliminates the requirement of characterization of the phase modulator or the pulse generator;
  eliminates the requirement of having a fixed Radio Frequency (RF) cable length of the modulating signal; and
  automatically re-aligns the modulating signal if the cable length/phase delay changes.

The embodiments herein and the various features and advantageous details thereof are explained with reference to the non-limiting embodiments in the foregoing description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. An apparatus (100) for adjusting the phase modulator's modulating signal time reference in a phase-based Quantum Key Distribution (QKD) system, said QKD system comprising a sending end node and a receiving end node, said sending end node comprising:
 a pulse generator (10) configured to generate a stream of optical pulses with a pre-defined time interval (T) between the adjacent pulses; and
 a phase modulator (20) configured to receive the optical pulses, during normal key exchange operation said phase modulator configured to use a non-return-to-zero (NRZ) modulating signal to modulate the phase of each of the pulses and generate a first stream of modulated pulses, said NRZ modulating signal being generated based on a random bit stream, said phase modulator (20) further configured to send the first stream of phase modulated pulses to the receiving end node through a quantum channel, said apparatus (100) comprising:
 a processing device (104) configured to detect a phase modulator (PM) alignment state and generate a return-to-zero (RZ) modulating signal during said PM alignment state, said processing device (104) further configured to send the generated RZ modulating signal to said phase modulator (20) to facilitate modulation of each of the optical pulses by the phase modulator in accordance with the RZ modulating signal leading to the generation of a second stream of modulated pulses, said RZ modulating signal is encoded with consecutive one and zero bits and generated using a time reference;
 a beam splitter (112) located in the quantum channel and connected to said phase modulator (20), said beam splitter (112) configured to receive said second stream of phase modulated pulses from the phase modulator (20) and split the received second stream of phase modulated pulses into two consequent phase modulated pulses for propagation along a first path (C1) of the quantum channel to said receiving end node and along a second path (C2) for phase adjustment;
 a two-arm interferometer (110) having two output legs (110a, 110b) and located in the second path (C2) from the beam splitter (112), said interferometer (110) configured to receive the modulated pulses through the second path (C2) and provide demodulated pulses having the pre-defined time interval (T) between adjacent pulses at the output legs (110a, 110b);
 a first photodetector (106) connected to a first output leg (110a) of said interferometer (110), and configured to receive said demodulated pulses after constructive interference from said interferometer (110) and generate a corresponding digital output; and a second photodetector (108) connected to a second output leg (110b) of said interferometer (110), and configured to receive said demodulated pulses after destructive interference from said interferometer (110) and generate a corresponding digital output;
 wherein said processing device (104) is configured to receive said digital outputs from said photodetectors (106, 108) and measure an average power in each leg of the interferometer (110) based on said received digital outputs, said processing device (104) is further configured to implement a logic to detect a delay between the optical pulses generated by the pulse generator (10) and the modulating signal based on the measured average power and adjust the time reference to compensate the detected delay for aligning the pulse generator (10) with the phase modulator (20).

2. The apparatus (100) as claimed in claim 1, wherein said processing device (104) comprises:
 a. a signal generator (202) configured to detect the PM alignment state and generate the alternate one and zero Return-to-zero (RZ) encoded signal of half bit interval pulse-width (i.e. T/2), using the time reference, as the RZ modulating signal of the phase modulator (20) during the PM alignment state;
 b. a power measuring unit (204) configured to measure the average power in each leg of the interferometer (110) using the digital outputs from said first and second photodetectors (106, 108);
 c. a delay detection unit (206) configured to cooperate with said power measuring unit (204) to compare the average power measured in first leg of the interferometer (110) with the average power measured in second leg to detect the delay between the optical pulses generated by the pulse generator (10) and the RZ modulating signal; and
 d. a delay adjusting unit (208) configured to cooperate with said delay detection unit (206) to compensate the detected delay by shifting the phase modulator's modulating signal time reference until the average power measured in one leg of said interferometer (110) is greater than the average power measured in the other leg.

3. The apparatus (100) as claimed in claim 1, wherein said processing device (104) is an integral part of said phase modulator (20).

4. The apparatus (100) as claimed in claim 1, wherein said interferometer (110) comprises:
 a. an optical input path for receiving the second stream of modulated pulses from said beam splitter (112);
 b. at least two interferometer arms connected to said optical input path, one of the arms including a delay element (110c) for providing the pre-defined time interval (T) between the received successive modulated pulses; and
 c. two output legs (110a, 110b) connected to said interferometer arms, said output legs (110a, 110b) configured to receive the demodulated pulses from said arms and feed the demodulate pulses to said first and second photodetectors (106, 108).

5. The apparatus (100) as claimed in claim 1, wherein said photodetectors (106, 108) are connected to the output legs (110a, 110b) of said interferometer (110) in a way that, if adjacent pulses are in phase, the demodulated pulse will appear at said first photodetector (106) and if adjacent pulses are out of phase, the demodulated pulse will appear at said second photodetector (108).

6. The apparatus (100) as claimed in claim 1, wherein said photodetectors (106, 108) are connected to the output legs (110a, 110b) of said interferometer (110) in a way that if adjacent pulses are in phase, the demodulated pulse will appear at said second photodetector (108) and if adjacent pulses are out of phase, the demodulated pulse will appear at said first photodetector (106).

7. The apparatus (100) as claimed in claim 2, wherein said delay detection unit (206) comprises:
   a. a comparator (206a) configured to compare the average power measured in first leg of the interferometer (110) with the average power measured in second leg to generate a comparison output; and
   b. a detecting module (206b) configured to cooperate with said comparator (206a) to detect the presence of the delay between the optical pulses and the modulating signal when said comparison output is below a pre-defined range which is caused by measurement of a non-zero average power at both the first output leg (110a) and the second output leg (110b).

8. The apparatus (100) as claimed in claim 1, wherein said processing device (104) is implemented using one or more Programmable logic devices selected from the group consisting of a mask programmable gate array (MPGA), an Application Specific Integrated Circuit (ASIC), a simple programmable logic device (SPLD), a complex programmable logic device (CPLD), and a Field Programmable Gate Array (FPGA).

9. A method (300) for adjusting the phase modulator's modulating signal time reference in a phase-based Quantum Key Distribution (QKD) system, said QKD system comprising a sending end node and a receiving end node, said sending end node comprising a pulse generator (10) configured to generate a stream of optical pulses with a pre-defined time interval (T) between the adjacent pulses and a phase modulator (20) configured to receive the optical pulses, use a non-return-to-zero (NRZ) modulating signal to modulate the phase of each of the pulses thereby generating a first stream of modulated pulses, and send the first stream of phase modulated pulses to the receiving end node through a quantum channel, said NRZ modulating signal generated based on a random bit stream,
said method (300) comprising the following steps:
   detecting (step-302), by a processing device (104), a phase modulator (PM) alignment state of the QKD system;
   generating (step-304), by said processing device (104), a return-to-zero (RZ) modulating signal during said PM alignment state, said RZ modulating signal being encoded with consecutive one and zero bits and generated using a time reference;
   sending (step-306), by said processing device (104), the generated RZ modulating signal to said phase modulator (20) to facilitate modulation of each of the optical pulses by the phase modulator in accordance with the RZ modulating signal leading to the generation of a second stream of modulated pulses;
   receiving (step-308), by a beam splitter (112) located in the quantum channel and connected to said phase modulator (20), said second stream of phase modulated pulses from the phase modulator (20);
   splitting (step-310), by said beam splitter (112), the received second stream of phase modulated pulses into two consequent phase modulated pulses for propagation along a first path (C1) of the quantum channel to said receiving end node and along a second path (C2) for phase adjustment;
   receiving (step-312), by a two-arm interferometer (110) having two output legs (110a, 110b) and located in the second path (C2) from the beam splitter (112), the modulated pulses through the second path (C2);
   providing (step-314), by said interferometer (110), demodulated pulses having the pre-defined time interval (T) between adjacent pulses at the output legs (110a, 110b);
   receiving (step-316), by a first photodetector (106) connected to a first output leg (110a) of said interferometer (110), said demodulated pulses after constructive interference from said interferometer (110) and generating a corresponding digital output;
   receiving (step-318), by a second photodetector (108) connected to a second output leg (110b) of said interferometer (110) said demodulated pulses after destructive interference from said interferometer (110) and generating a corresponding digital output; and
   receiving (step-320), by said processing device (104), said digital outputs from said photo detectors;
   measuring (step-322), by said processing device (104), an average power in each leg of the interferometer (110) based on said received digital outputs;
   implementing (step-324), by said processing device (104), a logic to detect a delay between the optical pulses generated by the pulse generator (10) and the modulating signal based on the measured average power; and
   adjusting (step-326), by said processing device (104), the time reference to compensate the detected delay for aligning the pulse generator (10) with the phase modulator (20).

10. The method (300) as claimed in claim 9, wherein the step (320) of adjusting, by said processing device (104), the time reference to compensate the detected delay comprises shifting the phase modulator's modulating signal time reference until the average power measured in one leg of said interferometer (110) is greater than the average power measured in the other leg.

* * * * *